(12) United States Patent
Zouboff et al.

(10) Patent No.: US 9,702,786 B2
(45) Date of Patent: Jul. 11, 2017

(54) METHOD FOR IDENTIFYING THE EDGES ON A CAMSHAFT TARGET

(71) Applicants: CONTINENTAL AUTOMOTIVE FRANCE, Toulouse (FR);
CONTINENTAL AUTOMOTIVE GmbH, Hannover (DE)

(72) Inventors: Pierre Zouboff, Toulouse (FR); Jerome Lachaize, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 276 days.

(21) Appl. No.: 14/404,651

(22) PCT Filed: Jun. 4, 2013

(86) PCT No.: PCT/EP2013/001631
§ 371 (c)(1),
(2) Date: Dec. 1, 2014

(87) PCT Pub. No.: WO2013/185890
PCT Pub. Date: Dec. 19, 2013

(65) Prior Publication Data
US 2015/0114097 A1    Apr. 30, 2015

(30) Foreign Application Priority Data
Jun. 12, 2012  (FR) ...................................... 12 55482

(51) Int. Cl.
*F01L 1/34*     (2006.01)
*G01M 15/06*    (2006.01)
(Continued)

(52) U.S. Cl.
CPC .......... G01M 15/06 (2013.01); F02D 41/009 (2013.01); G01M 15/046 (2013.01); *F02D 41/222* (2013.01)

(58) Field of Classification Search
CPC .... F02D 41/009; F02D 41/222; G01M 15/06; G01M 15/046
(Continued)

(56) References Cited

U.S. PATENT DOCUMENTS

| | | |
|---|---|---|
| 5,671,145 A | 9/1997 | Krebs et al. |
| 6,679,223 B2 | 1/2004 | Sakakibara |

(Continued)

FOREIGN PATENT DOCUMENTS

| | | |
|---|---|---|
| CN | 102155313 A | 8/2011 |
| EP | 0683309 A1 | 11/1995 |

(Continued)

OTHER PUBLICATIONS

International Search Report, dated Jun. 28, 2013, from corresponding PCT application.

*Primary Examiner* — Ching Chang
(74) *Attorney, Agent, or Firm* — Young & Thompson

(57) ABSTRACT

Process for identifying edges on a camshaft target (30) having a plurality of teeth on the periphery thereof, the plurality of teeth forming a series of M edges when the
(Continued)

Figure 1:
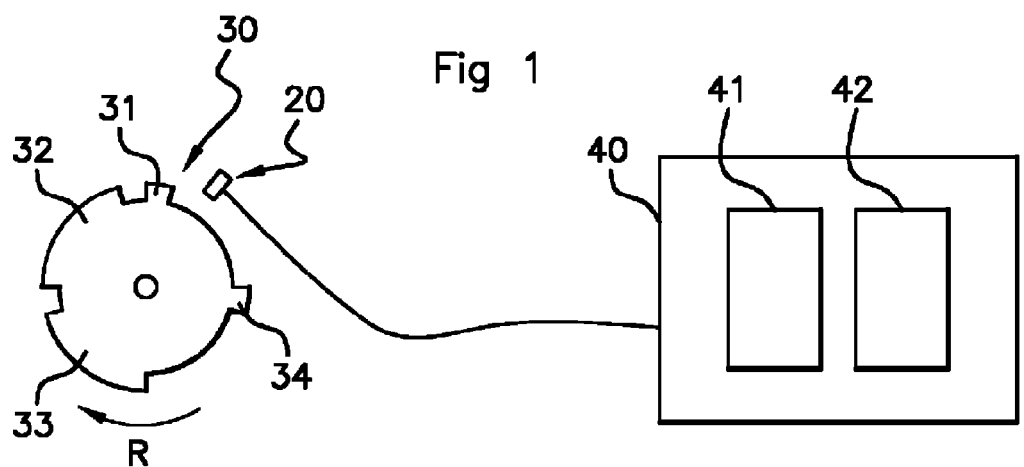

camshaft rotates through one revolution, the process including the following steps:

calculating, for each of the M edges, the characteristic:

$$CP(j) = \left[ \frac{\sum_{i=1}^{N} P(j-i+1) + \sum_{i=3N}^{4N-1} P(j-i)}{\sum_{i=N}^{3N-1} P(j-i)} \right]_{N \geq 1}$$

P(i) denoting the angular distance between the edge i and the preceding edge, during the movement of the camshaft target, calculating, during an edge detection, an index:

$$CT(k) = \left[ \frac{\sum_{i=1}^{N} T(k-i+1) + \sum_{i=3N}^{4N-1} T(k-i)}{\sum_{i=N}^{3N-1} T(k-i)} \right]_{N \geq 1}$$

T(i) denoting the time elapsed since the appearance of the edge i−1 to the edge i, comparing the index CT(k) with each of the CP(j), determining the position of the camshaft.

18 Claims, 2 Drawing Sheets

(51) Int. Cl.
*F02D 41/00* (2006.01)
*G01M 15/04* (2006.01)
*F02D 41/22* (2006.01)

(58) Field of Classification Search
USPC .......................................... 123/90.15, 90.17
See application file for complete search history.

(56) References Cited

U.S. PATENT DOCUMENTS 7,143,728 B1 * 12/2006 Yasui ..................... F01L 1/34
123/90.15
7,428,459 B2  9/2008 Kondo
2002/0157641 A1  10/2002 Sakakibara

FOREIGN PATENT DOCUMENTS

EP           1400785 A2    3/2004
KR       20010059245 A    7/2001

* cited by examiner

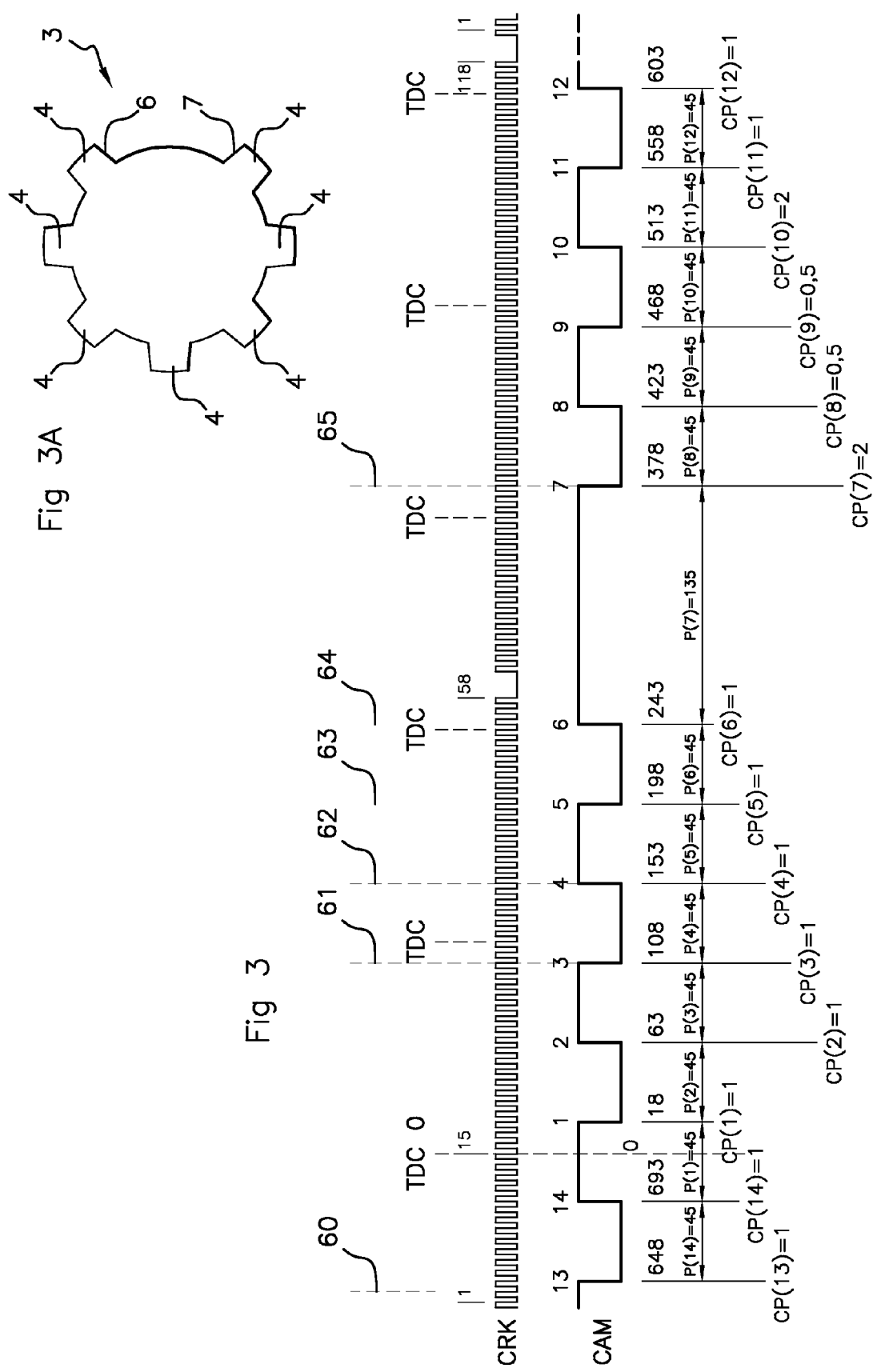

METHOD FOR IDENTIFYING THE EDGES ON A CAMSHAFT TARGET

BACKGROUND OF THE INVENTION

Field of the Invention

The present invention relates to methods for identifying edges on a camshaft target for an internal combustion engine.

More particularly, the invention relates to a process for identifying edges on a camshaft target of an internal combustion engine rotating in a conventional direction of rotation and controlled by a control unit referred to as a "UCE". Said camshaft target has a plurality of teeth over the periphery thereof, the plurality of teeth forming, for a position sensor facing said teeth, a series of edges when the camshaft rotates by one revolution.

Description of the Related Art

A four-stroke internal combustion engine of the most currently widespread type (intake-compression-combustion-exhaust) requires two crankshaft revolutions (the crankshaft being formed integrally with the movable equipment formed by connecting rods and pistons moving in cylinders) in order to describe the four strokes of the cycle. The camshaft, for its part, describes only a single revolution during the same four-stroke cycle. By combining (or not) the information provided by sensors associated with targets integral with the crankshaft and/or the camshaft, various items of information useful for the control of the operating parameters of the engine are obtained. The sensor associated with the crankshaft usually makes it possible to determine the exact position of the engine.

A camshaft target is used to obtain information concerning the angular position of the camshaft. In accordance with a very simple version, the target makes it possible to know whether the engine cycle is in the first or the second crankshaft revolution, the camshaft turning twice as slow and making it possible to eradicate the uncertainty concerning the position of the engine created with a position sensor placed on the crankshaft.

In more complex versions, the camshaft target can be used to perform the function known under the term "VVT", that is to say "variable valve timing", for which one or more camshafts can be angularly offset dynamically in relation to the nominal position thereof and thus make it possible to vary the moments of opening and closure of valves.

Lastly, a camshaft target can also be used to remedy the case in which the information obtained directly concerning the position of the crankshaft is debased or defective. In this particular case, the real-time management of the engine will be based on the information concerning the position of the camshaft obtained by means of the camshaft position sensor and the target.

It is known, for example from document U.S. Pat. No. 7,428,459, to detect the position of a camshaft target and to control the engine management tasks, such as the ignition of the fuel/oxidant mixture, the injection, and other accompanying tasks. More particularly, said document concerns the identification of the edges representing the teeth of the target at the moment of the first transitions after initialization in order to know the position of the camshaft without ambiguity.

However, in the prior art, the logic for recognition involves the implementation of an edge identification strategy that is dependent directly on the geometric profile and the position of the teeth on the periphery of the camshaft target. For an application with a camshaft target of different form, it is thus necessary to conceive a different edge identification strategy.

SUMMARY OF THE INVENTION

In order to overcome this disadvantage, the present invention proposes a process for identifying edges on a camshaft target of an internal combustion engine rotating in a normal direction of rotation and controlled by a control unit, said camshaft target having a plurality of teeth on the periphery thereof, the plurality of teeth forming, for a position sensor facing said teeth, a series of M significant edges when the camshaft rotates by one revolution, the process comprising the following steps:

a) calculating, for each of the M significant edges, a characteristic relating to the position of the edges preceding said edge in the normal direction of rotation, said characteristic being defined by the formula $$CP(j) = \left[ \frac{\sum_{i=1}^{N} P(j-i+1) + \sum_{i=3N}^{4N-1} P(j-i)}{\sum_{i=N}^{3N-1} P(j-i)} \right]_{N \geq 1}$$

P(i) denoting the angular distance between the significant edge i and the preceding edge, and storing at least these M values CP(j), j ranging from 1 to M, in a memory of the control unit 40, b) defining a sub-list of significant edges and initializing this sub-list with all significant edges, c) during the displacement of the camshaft target, calculating as soon as possible, during a significant edge detection, an index relating to the time intervals elapsed since the preceding edges, by means of the formula:

$$CT(k) = \left[ \frac{\sum_{i=1}^{N} T(k-i+1) + \sum_{i=3N}^{4N-1} T(k-i)}{\sum_{i=N}^{3N-1} T(k-i)} \right]_{N \geq 1}$$

T(i) denoting the time elapsed since the appearance of the edge i−1 until the edge i, d) comparing the index CT(k) with each of the intervals INT(j) defined by $$\left[ \frac{CP(j)}{Coeff}, Coeff \times CP(j) \right]$$

and eliminating from the sub-list the edges j for which the index CT(k) is outside the interval INT(j), e) waiting for the appearance of a new significant edge, replacing each edge j of the sub-list by the immediate successor thereof j+1 modulo M, then repeating steps c) to d) until at least one edge is obtained in the sub-list at step d), f) identifying the position of the camshaft once a single edge is obtained in the sub-list.

As a result of these provisions, information concerning the position of the camshaft is obtained, and the position of the camshaft is identified without ambiguity. It is also possible to identify a conformity fault of the profile of the camshaft target.

In addition, it is possible to implement a single strategy, compatible with all forms of camshaft target, the different forms being able to be defined easily by parameters of the "calibration" type.

In various embodiments of the invention, it may be necessary to resort additionally to one or more of the following provisions:
- a single edge can be obtained in the sub-list, in consideration of which the position of the camshaft can be known without ambiguity:
- it is possible to select N=1, then the expressions of CP(K) and CT(k) become:

$$CP(j) = \left[\frac{P(j) + P(j-3)}{P(j-2) + P(j-1)}\right]_{N=1}$$

and $$CT(k) = \left[\frac{T(K) + T(k-3)}{T(k-2) + T(k-1)}\right]_{N=1}$$

Thus, the calculation is simple and can be implemented once five edges have passed by:
- the margin coefficient Coeff may be between 1.05 and 4; such that the rotation irregularities are taken into consideration;
- after initialization, 4N+1 edges can be awaited before starting the calculations defined in step c);
- the significant edges may be falling or rising edges, in consideration of which all the edges are exploited;
- the significant edges may be solely rising edges; this being the case on certain types of targets;
- the significant edges may be solely falling edges;
- the target may comprise teeth generating regularly spaced rising edges, in consideration of which the management of the VVT function is made simpler;
- the target may comprise teeth generating regularly spaced falling edges;
- the calculations of the index CT(k) can be used to detect a conformity fault of the camshaft target; such that the diagnostics can be improved.
- the formulation of the calculation of the index CT(k) is suitable for any type of target having a profile without periodicity within a revolution, and the calculation is included in functions of the basic software, whereas the angular distances are parameters stored in the form of calibration data or derived from parameters stored in the form of calibration data; such that the tasks of validation of the software are more rational and are optimized.

BRIEF DESCRIPTION OF THE DRAWING FIGURES

Figure 2:
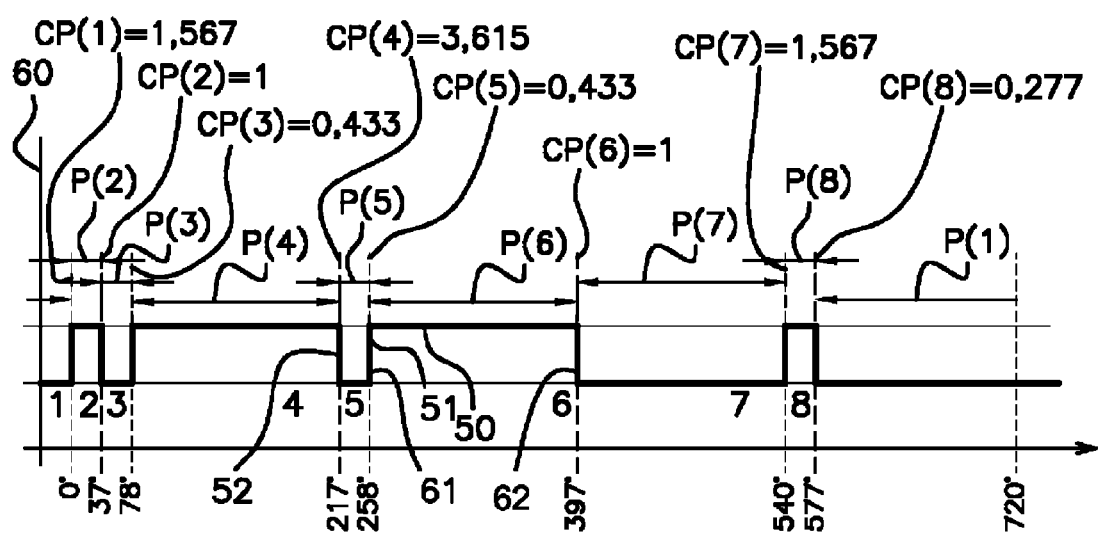

Further features, objectives and advantages of the invention will become clear upon reading the following description of one of the embodiments of the invention, given by way of non-limiting example. The invention will also be better understood with reference to the accompanying drawings, in which:

FIG. 1 schematically shows a system in which the process according to the invention is implemented, FIG. 2 shows a chronogram in accordance with a first example of a camshaft target, FIG. 3 shows a chronogram in accordance with a second example of a camshaft target, shown in FIG. 3A.

In the various figures, the same references denote identical or similar elements.

DETAILED DESCRIPTION OF THE INVENTION

FIG. 1 shows a system for acquiring the position of a camshaft of an internal combustion engine, comprising a control unit 40, a position sensor 20 and a target 30 connected rotatably to a camshaft. The control unit 40, also referred to as a UCE, comprises a processor 41 and a non-volatile memory 42. The target 30 is generally present as a disk with elements arranged on the periphery of the disk, said elements being referred to conventionally as "teeth". When the camshaft rotates, usually in the direction denoted by the arrow R, the passing of the teeth 31, 32, 33, 34 generates electrical signals 50 at the position sensor 20, said electrical signals generating images of the form of the teeth. The electrical signals 50 comprise rising edges 51 corresponding to the starting edges of the teeth 31, 32, 33, 34 and falling edges 52 corresponding to the terminating edges of the teeth 31, 32, 33, 34. However, the logic could be reversed.

The chronogram of FIG. 2 shows a signal corresponding to the target 30 shown in FIG. 1. The target 30 comprises four teeth 31, 32, 33, 34, corresponding to four rising edges and four falling edges, that is to say eight edges in total. For the further description, the notion of a significant edge is introduced: a significant edge is a type of edge that is processed by the identification logic implemented in the control unit 40. For some types of camshaft target, the significant edges are the rising and falling edges, whereas for other types of camshaft targets only the rising or falling edges are significant edges.

The number of significant edges over a revolution of a camshaft target is denoted by M hereinafter.

In the example of FIGS. 1 and 2, the rising edges are spaced regularly over the periphery of the target 30, which is favorable for the management of the function VVT, which is made simpler. However, it is not necessary for the falling (or rising) edges to be regularly spaced for the implementation of the invention. It is preferable for the target 30 to be devoid of symmetry with respect to the axis, in particular the pattern of teeth does not have to comprise a strictly periodic pattern over a camshaft revolution.

It should be noted that the internal combustion engine may comprise more than one camshaft, of which the angular position must be known. The invention can be used to detect the position of each camshaft, each having a camshaft target associated with a position sensor 20.

The geometric characteristics of the target 30 comprise the respective angular positions of each significant edge. In the case of the first example, the first significant edge is a rising edge located at 0° (see FIG. 2), the second is a falling edge located at 37°, the third is a rising edge located at 78°, the fourth is a falling edge located at 217°, the fifth is a rising edge located at 258°, the sixth is a falling edge located at 397°, the seventh is a rising edge located at 540°, and the eighth is a falling edge located at 577°.

It should be noted that, for the camshaft, all the positions and angular distances are expressed as equivalent of the positions and angular distances of the crankshaft (engine cycle over 720°, which corresponds to one camshaft revolution).

P(j) denotes the angular distance between the significant edge j and the preceding edge, thus for the first example P(1)=143°, P(2)=37°, P(3)=41°, P(4)=139°, P(5)=41°, P(6)=139°, P(7)=143°, P(8)=37°.

Ratios referred to as CP(j), j ranging from 1 to M, are calculated on the basis of these angular distances thanks to the formula below:

$$CP(j) = \left[ \frac{\sum_{i=1}^{N} P(j-i+1) + \sum_{i=3N}^{4N-1} P(j-i)}{\sum_{i=N}^{3N-1} P(j-i)} \right]_{N \geq 1}$$

N is referred to as the order of calculation of the index. It is an integer greater than or equal to 1. In the simplest case, N=1. In specific cases, it could be that N=2 or N=3.

For N=1, the expression CP(j) is simplified into:

$$CP(j) = \left[ \frac{P(j) + P(j-3)}{P(j-2) + P(j-1)} \right]_{N=1}$$

In accordance with the process of the invention, at least these M characteristic values CP(j) are stored in a non-volatile memory 42 of the control unit 40. P(j) and/or CP(j) are preferably data referred to as "calibration" data, therefore parameters called up by the basic software, but not included in the basic software.

In accordance with the first example, the calculation to the order 1 (N=1) gives CP(1)=1.567, CP(2)=1, CP(3)=0.433, CP(4)=3.615, CP(5)=0.433, CP(6)=1, CP(7)=1.567, and CP(8)=0.277.

In addition, a sub-list of significant edges is defined, and this sub-list is initialized with all M significant edges (here, for the first example, edges number 1 to number 8).

When the control unit 40 is turned on, it is initialized and does not know the current position of the camshaft. Only the geometric characteristics of the target, of which the characteristic values CP(j) have been deduced, are known.

When the camshaft is moved, edges of the target 30 pass in front of the sensor 20, but the processor 41 of the control unit 40 has no means of knowing which edge this is. The control unit 40 will then implement the logic (or "strategy") in order to identify as quickly as possible the edge or edges passing in front of the sensor 20.

The strategy implemented utilizes calculations based on the time intervals between each edge passed previously in front of the sensor 20.

As soon as is possible, the following index is calculated:

$$CT(k) = \left[ \frac{\sum_{i=1}^{N} T(k-i+1) + \sum_{i=3N}^{4N-1} T(k-i)}{\sum_{i=N}^{3N-1} T(k-i)} \right]_{N \geq 1}$$

It is necessary to await 4N+1 edges in order to be able to calculate the index above. It is therefore pertinent to select the order N=1 so as to be able to calculate such an index after 4N intervals between edges, that is to say at the fifth edge when N=1 (numeral 61 in FIG. 2). The index is thus a ratio of time intervals.

When N is selected at the value N=1, the expression of CT(k) is simplified into:

$$CT(k) = \left[ \frac{T(K) + T(k-3)}{T(k-2) + T(k-1)} \right]_{N=1}$$

If the speed of rotation of the engine is uniform, then CT(j)=CP(j) for j from 1 to M. In reality, when the engine rotates, and in particular during the first revolutions, the speed of rotation is not at all uniform. It is then not possible to deduce the value of j starting from the value of the index CP(j). An uncertainty, represented by a margin coefficient of uncertainty referred to as the coefficient Coeff, must be tolerated.

Thus, after the calculation of the index CT(k), the calculated index is compared with each of the characteristics CP(j) and in particular with intervals INT(j) framing each CP(j) respectively.

$$INT(j) \text{ is defined by} \left[ \frac{CP(j)}{Coeff}, Coeff \times CP(j) \right].$$

Advantageously, the coefficient Coeff is between 1.05 and 4.

Following these comparisons, the edges j for which the index CT(k) is outside the interval INT(j), are eliminated from the sub-list.

It should be noted that some CP(j), CP(j') may have similar or equal values, however the respective successors thereof CP(j+1), CP(j'+1) have different values, which makes it possible to distinguish between j and j'.

With reference to FIG. 2, the camshaft starts to rotate at the moment 60, and it is necessary to await the fifth significant edge in order to be able to proceed to the first calculation, just after the rising edge denoted by 51. The index value CT(k) calculated will fall in a range around 0.43. For a coefficient Coeff for example of 1.5, the candidate edges for which the value CT(k) will be within the interval INT(j) will be edges number 3 and number 5. The sub-list thus contains the sole edges 3 and 5 after this first step, because edges 1, 2, 4, 6, 7 and 8 will have been eliminated.

Then, if there is still more than one candidate edge in the sub-list, the process is repeated, because it is in fact a process of successive elimination.

The appearance of the following significant edge (denoted by 62) is then awaited, and the calculation CT(k) is restarted. However, it is necessary to proceed with a lag of the sub-list of candidate edges. Each edge j in the sub-list is then replaced by the immediate successor thereof j+1. This is done modulo M, that is to say the first edge (number 8) is replaced by the first (number 1). In the illustrated example, the sub-list contains edges numbers 4 and 6 at the end of the lag.

In the illustrated example, the following edge provokes a new calculation CT(k), which will fall in a range around 1. Then, only edge number 6 will be retained because CT(k) falls in INT(6) and edge number 4 will be eliminated because its INT(4) is around 3.615, far from CT(k). it is thus concluded that the edge that has just passed is the edge number 6, which makes it possible to identify without ambiguity the position of the camshaft.

Of course, in the process of elimination of the candidates in the sub-list, if the significant edges are rising and falling, it is possible to also use the specific rising or falling type in order to eliminate half of the candidate edges from the first edge detection.

FIG. 3A shows a second example of a type of camshaft target 3. The target 30 has seven teeth denoted by 4, and therefore the profile of the signal comprises fourteen edges, that is to say seven rising edges 7 and seven falling edges 6. This is a target 3 fitted in a six-cylinder engine with six top dead center (TDC) points over the engine cycle of 720 degrees of crankshaft angle, however, the method can be applied whatever the number of cylinders and engine configuration.

FIG. 3 reproduces a start-up phase and comprises the signal CRK delivered by the position sensor associated with the crankshaft, the signal CAM delivered by the position sensor associated with the camshaft, and also the magnitudes associated with the detection of teeth of the target 3 shown in FIG. 3A (similarly to those shown in FIG. 2, that is to say the indexes of the teeth 4 and the values P(i), CP(i)).

The signal CRK delivered by the position sensor associated with the crankshaft is delivered from the detection by a sensor 20 of a target 30 (not shown) comprising sixty teeth on the periphery thereof, equidistantly distributed and of identical dimensions. This target comprises a reference index provided by means of the deletion of two of these sixty teeth. The target thus has fifty-eight teeth and a reference space corresponding to the deletion of two teeth. This reference zone is located over the signal CRK delivered by the position sensor associated with the crankshaft after the indexes 58 and 118.

The crankshaft starts to turn at the moment 60. Once 4 edges have passed, the first calculation CT(k) is performed on the fifth edge at the moment 61. The comparison with all CP(j) is then performed.

In the second example, the CT(j) are distributed between the value 2 (2 times), the value 0.5 (2 times) and the value 1 (10 times); see FIG. 3.

CT(j) for the first calculation gives approximately 1, which makes it possible to eliminate the edges 7, 8, 9 and 10. The sub-list then contains the edges 1 to 6 and 11 to 14.

After a lag, the edges 1 to 7 and 12 to 14 are then contained in the sub-list.

The following calculation, performed at the moment 62, also gives an index of approximately 1 for CT(j), which again eliminates 7, 8, 9 and 10. The sub-list then contains the edges 1 to 6 and 12 to 14. After a lag, the edges 1 to 7 and 13 to 14 are contained in the sub-list.

The following calculation, performed at the moment 63, also gives an index of approximately 1, which again eliminates 7, 8, 9 and 10. The sub-list then contains the edges 1 to 6 and 13 to 14. After a lag, the edges 1 to 7 and 14 are contained in the sub-list.

The following calculation, performed at the moment 64, also gives an index of approximately 1, which again eliminates 7, 8, 9 and 10. The sub-list then contains the edges 1 to 6 and 14. After a lag, the edges 1 to 7 are contained in the sub-list.

The following calculation, performed at the moment 65, gives an index of approximately 2, which eliminates the edges 1 to 6, 8, 9 and 11 to 14 (only numbers 7 and 10 are retained). Thus, only the edge number 7 remains in the sub-list, therefore a single edge. The repetition can be stopped.

The unambiguous identification of the camshaft position is then obtained with the fifth step of calculation CT(j).

It should be noted that the calculation CT(k) can be performed even once the repetition has converged. In this case, this calculation will be used in order to detect any faults or non-conformities of the target, or interferences, for diagnostic purposes.

It is also possible to continue to know the position of the camshaft by incrementations by taking into account each new edge.

The one and same process, as described above, functions on any type of target other than those presented in the two examples above. Consequently, the algorithm can be developed once for all targets and can form part of the functions of the basic software. The parameterization of the algorithm then lies simply in the series of the positions and/or angular distances of the significant edges. Consequently, the angular distances are parameters stored in the form of calibration data or derived from parameters stored in the form of calibration data. This calibration data is loaded into a memory zone that can be easily modified or parameterized in the control unit 40 with a plurality of other parameters, which are used by the basic software.

It should be noted that the process according to the invention functions as soon as the target is non-multi-periodic, that is to say without strict periodicity over a revolution of target.

In accordance with the invention, the aforementioned calculations are also used for diagnostic purposes. It is in fact possible that the repetition of the calculations does not converge toward a sub-list having a single edge, and that the sub-list becomes an empty set, thus indicating a problem.

If the calculations have converged in the first instance and the position of the camshaft has been correctly identified, if the calculations then lead to an empty sub-list, this anomaly will then demonstrate a problem of interference of the signal.

By contrast, if, from the initialization, the calculations do not converge on an identification of the position of the camshaft, then this anomaly will demonstrate a problem of mechanical conformity of the target 30.

The invention claimed is:

1. A process for identifying edges on a camshaft target of an internal combustion engine rotating in a normal direction of rotation and controlled by a control unit, said camshaft target having a plurality of teeth on the periphery thereof, the plurality of teeth forming, for a position sensor facing said teeth, a series of significant edges when the camshaft rotates through one revolution, the significant edges being edges that are processed by identification logic, the process comprising the following steps:

a) calculating, for each of the significant edges, a characteristic relating to a position of the significant edges preceding said significant edge in accordance with the normal direction of rotation, said characteristic being defined by formula $$CP(j) = \left[ \frac{\sum_{i=1}^{N} P(j-i+1) + \sum_{i=3N}^{4N-1} P(j-i)}{\sum_{i=N}^{3N-1} P(j-i)} \right]_{N \geq 1}$$

P(i) denoting the angular distance between the significant edge i and the preceding significant edge on the camshaft, and storing at least these values CP(j), j ranging from 1 to the number of the significant edges, in a memory of the control unit,
b) defining a sub-list of significant edges and initializing the sub-list with all significant edges,
c) during the movement of the camshaft target, calculating, during a significant edge detection, an index relating to time intervals elapsed since the preceding significant edges, by the formula:

$$CT(k) = \left[\frac{\sum_{i=1}^{N} T(k-i+1) + \sum_{i=3N}^{4N-1} T(k-i)}{\sum_{i=N}^{3N-1} T(k-i)}\right]_{N \geq 1}$$

T(i) denoting time elapsed since an appearance of significant edge i−1 until the significant edge i,
d) comparing the index CT(k) with each of intervals INT(j) defined by $$\left[\frac{CP(j)}{Coeff}, Coeff \times CP(j)\right]$$

and eliminating from the sub-list the significant edges j for which the index CT(k) is outside the interval INT(j), where Coeff is a margin coefficient of uncertainty,
e) awaiting an appearance of a new significant edge, replacing each edge j in the sub-list by its immediate successor j+1 modulo, then repeating steps c) to d) until at most one significant edge is obtained in the sub-list in step d),
f) identifying the position of the camshaft once a single significant edge has been obtained in the sub-list.

2. The process as claimed in claim 1, wherein N=1, and the expressions of CP(j) and CT(k) become:

$$CP(j) = \left[\frac{P(j) + P(j-3)}{P(j-2) + P(j-1)}\right]_{N=1} \text{ and}$$

and $$CT(k) = \left[\frac{T(K) + T(k-3)}{T(k-2) + T(k-1)}\right]_{N=1}.$$

3. The process as claimed in claim 2, wherein the margin coefficient Coeff is between 1.05 and 4.
4. The process as claimed in claim 2, wherein, after initialization, 4N+1 edges are awaited before starting the calculations defined in c).
5. The process as claimed in claim 2, wherein the significant edges are falling or rising edges.
6. The process as claimed in claim 2, wherein the significant edges are solely rising edges.
7. The process as claimed in claim 2, wherein the significant edges are solely falling edges.
8. The process as claimed in claim 1, wherein the margin coefficient of uncertainty Coeff is between 1.05 and 4.
9. The process as claimed in claim 1, wherein, after initialization, 4N+1 significant edges are awaited before starting the calculations defined in c).
10. The process as claimed in claim 1, wherein the significant edges are falling or rising edges.
11. The process as claimed in claim 10, wherein the target comprises teeth generating regularly spaced rising edges.
12. The process as claimed in claim 10, wherein the target comprises teeth generating regularly spaced falling edges.
13. The process as claimed in claim 1, wherein the significant edges are solely rising edges.
14. The process as claimed in claim 13, wherein the camshaft target comprises teeth generating regularly spaced rising edges.
15. The process as claimed in claim 13, wherein the camshaft target comprises teeth generating regularly spaced falling edges.
16. The process as claimed in claim 1, wherein the significant edges are solely falling edges.
17. The process as claimed in claim 16, wherein the camshaft target comprises teeth generating regularly spaced falling edges.
18. The process as claimed in claim 1, wherein calculations of the index CT(k) are used in order to detect a conformity fault of the camshaft target.

* * * * *